United States Patent
Zhang et al.

(10) Patent No.: US 7,388,932 B1
(45) Date of Patent: Jun. 17, 2008

(54) FULLY PARALLEL MULTI-CHANNEL DEMODULATOR

(75) Inventors: WeiMin Zhang, San Jose, CA (US); Vladimir Radionov, San Ramon, CA (US); Roger Stenerson, Sunnyvale, CA (US); Bin-Fan Liu, Livermore, CA (US); Yu Kou, San Jose, CA (US)

(73) Assignee: Broadlogic Network Technologies, Inc., San Jose, CA (US)

( * ) Notice: Subject to any disclaimer, the term of this patent is extended or adjusted under 35 U.S.C. 154(b) by 642 days.

(21) Appl. No.: 10/335,209

(22) Filed: Dec. 30, 2002

(51) Int. Cl.
  *H03K 9/00* (2006.01)
(52) U.S. Cl. .................................................. 375/316
(58) Field of Classification Search ................ 375/260, 375/316, 259; 370/210, 343, 329, 479, 436, 370/478, 465; 455/132, 234.1; 725/68, 725/100, 139, 151
  See application file for complete search history.

(56) References Cited

U.S. PATENT DOCUMENTS

| | | | |
|---|---|---|---|
| 6,005,855 A | | 12/1999 | Zehavi et al. |
| 6,038,435 A | * | 3/2000 | Zhang ...................... 455/234.1 |
| 6,061,406 A | * | 5/2000 | Carson et al. .............. 375/260 |
| 6,122,295 A | * | 9/2000 | Kato et al. .................. 370/479 |
| 6,205,133 B1 | * | 3/2001 | Bexten ........................ 370/343 |
| 6,466,591 B1 | * | 10/2002 | See et al. .................... 370/535 |
| 6,704,372 B2 | * | 3/2004 | Zhang et al. ................ 375/316 |

(Continued)

FOREIGN PATENT DOCUMENTS

JP        09-507618 A      7/1997

(Continued)

OTHER PUBLICATIONS

English translation of Notice of Reasons for Rejection of Dec. 28, 2007 for Japanese application 2004-563171.

*Primary Examiner*—Khanh C. Tran
(74) *Attorney, Agent, or Firm*—Townsend and Townsend and Crew LLP

(57) ABSTRACT

An improved multi-channel demodulator is provided. The improved demodulator includes an automatic gain control, a data buffer and a demodulation engine. Data from various RF channels are processed by the automatic gain control in order to keep the data at their respective constant levels. Output from the automatic gain control is passed to the data buffer for storage. Corresponding data from a selected channel is then processed by the demodulation engine. The improved demodulator is able to operate in any one of three operating modes, namely, a data processing mode, a channel switching mode and a waiting mode. In the data processing mode, the demodulation engine processes the channel data that is currently loaded into the demodulation engine. In the channel switching mode, the demodulation engine stores the current channel data into the data buffer and retrieves and loads channel data from another channel for processing. In addition, status and history information relating to the current channel data is stored into a channel status memory and status and history information relating to the next channel to be processed is retrieved from the channel status memory. In one exemplary aspect, in order to reduce the channel switching time, status and history information relating to the next channel to be processed is preloaded during the previous data processing mode. In the waiting mode, the demodulation engine awaits further processing instructions to decide whether to enter into either the data processing mode or the channel switching mode.

39 Claims, 6 Drawing Sheets

U.S. PATENT DOCUMENTS

| | | | |
|---|---|---|---|
| 6,791,995 B1 * | 9/2004 | Azenkot et al. | 370/436 |
| 2001/0030940 A1 * | 10/2001 | Hellberg | 370/210 |
| 2003/0131191 A1 | 7/2003 | Zhang et al. | |

FOREIGN PATENT DOCUMENTS

| | | |
|---|---|---|
| JP | 2001-069020 A | 3/2003 |
| JP | 2003-324776 A | 11/2003 |
| WO | WO 95/12261 A1 | 5/1995 |
| WO | WO 96/34480 A1 | 10/1996 |

\* cited by examiner

FULLY PARALLEL MULTI-CHANNEL DEMODULATOR

BACKGROUND OF THE INVENTION

The present invention generally relates to demodulators and, more specifically, to an improved design for a fully parallel multi-channel demodulator.

Traditional digital cable, satellite and terrestrial broadcast systems utilize a large number of frequency-division multiplexed RF channels. Under conventional systems, each RF channel is typically handled by corresponding dedicated circuitry. FIG. 1 is a simplified block diagram illustrating typical circuitry used to handle RF channels. As shown in FIG. 1, a typical demodulator chip includes a channel processing block 10 for each RF channel. Each channel processing block 10 further includes an analog-digital converter (ADC) 12, a demodulator block 14 providing functionality such as automatic gain control (AGC), timing recovery, equalization and carrier recovery, and a forward error correction (FEC) block 16. For example, a digital cable receiver chip designed to accommodate two channels includes two channel processing blocks.

The architecture of the typical demodulator chip as shown in FIG. 1 has a number of problems or disadvantages. For example, the foregoing architecture is not cost effective as the number of RF channels increases. Since each channel has its own dedicated circuitry for signal processing, the corresponding circuitry remains idle when the associated channel is not active; even when the channel is active, the associated circuitry is only active during certain periods of time. As a result, silicon resources within the chip are not shared or utilized efficiently. In addition, the architecture does not scale well with silicon technology improvements. For example, as silicon technology improves to provide higher processing speed, the number of channels that can be processed remains the same.

Furthermore, FIR filters are commonly used in demodulators. FIG. 2 is a simplified schematic diagram illustrating a typical FIR filter. As shown in FIG. 2, a typical FIR filter processes an input data stream in a serial manner. In other words, the input data stream is processed sequentially by a number of multipliers. Each of these multipliers must be designed to accommodate the largest possible coefficient. Consequently, the size of each multiplier must be at least as large as the largest possible coefficient even though the largest possible coefficient may never be used. This design results in inefficient use of silicon resource.

Hence, it would be desirable to provide an improved design for a multi-channel demodulator in which the processing circuitry for RF channels is more efficiently utilized.

BRIEF SUMMARY OF THE INVENTION

An improved multi-channel demodulator is provided. The improved demodulator includes an automatic gain control, a data buffer and a demodulation engine. Data from various RF channels are processed by the automatic gain control in order to keep the signal strength in each RF channel at their respective constant levels. Output from the automatic gain control is passed to the data buffer for temporary storage. Corresponding data from a selected channel is then processed by the demodulation engine. In one exemplary implementation, the demodulation engine includes a timing recovery circuit, a matched filter, equalizer and carrier recovery circuit and a forward error correction circuit.

The improved demodulator is able to operate in any one of three operating modes, namely, a data processing mode, a channel switching mode and a waiting mode. In the data processing mode, the demodulation engine processes the channel data that is currently loaded into the demodulation engine. In the channel switching mode, the demodulation engine stores the current channel data into the data buffer and retrieves and loads channel data from another channel for processing. In addition, status and history information relating to the current channel data is stored into a channel status memory and status and history information relating to the next channel to be processed is retrieved from the channel status memory. In one exemplary aspect, in order to reduce the channel switching time, status and history information relating to the next channel to be processed is preloaded during the previous data processing mode. In the waiting mode, the demodulation engine awaits further processing instructions to decide whether to enter into either the data processing mode or the channel switching mode. When in the waiting mode, the demodulation engine is designed to have a power saving feature to reduce consumption of power.

In another exemplary aspect, the system includes a fully parallel low pass FIR filter. The fully parallel low pass FIR filter is designed to operate on multiple data streams in a concurrent manner. An input data stream from a channel is duplicated to generate the multiple data streams. The multiple data streams are respectively provided to corresponding multipliers. The size of each multiplier depends on the size of the data stream and a corresponding coefficient. Outputs from the multipliers are summed together to provide an output data stream. The fully parallel low pass FIR filter can be deployed within various components of the demodulation engine.

The present invention provides a number of benefits and/or advantages. For example, the demodulation engine can be used to process multiple RF channels. In other words, various RF channels are able to share the demodulation engine. Furthermore, the present invention also takes advantage of advancing silicon technologies. As processing speed increases, the demodulation engine is able to take advantage of the speed increase and processes more data (and/or more channels) without having to add on additional components.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
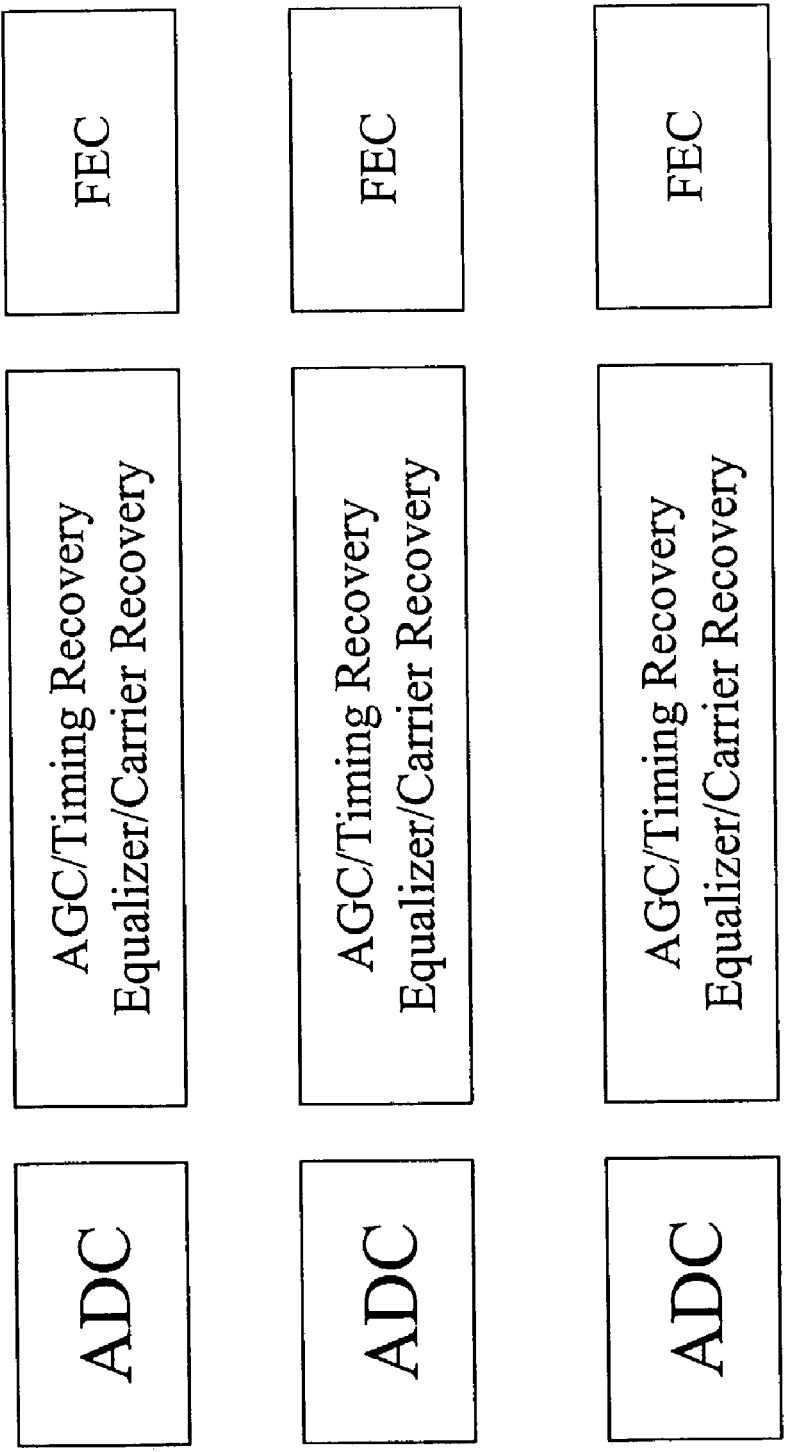
FIG. 1 is a simplified block diagram illustrating typical circuitry used to handle RF channels.
Figure 2:
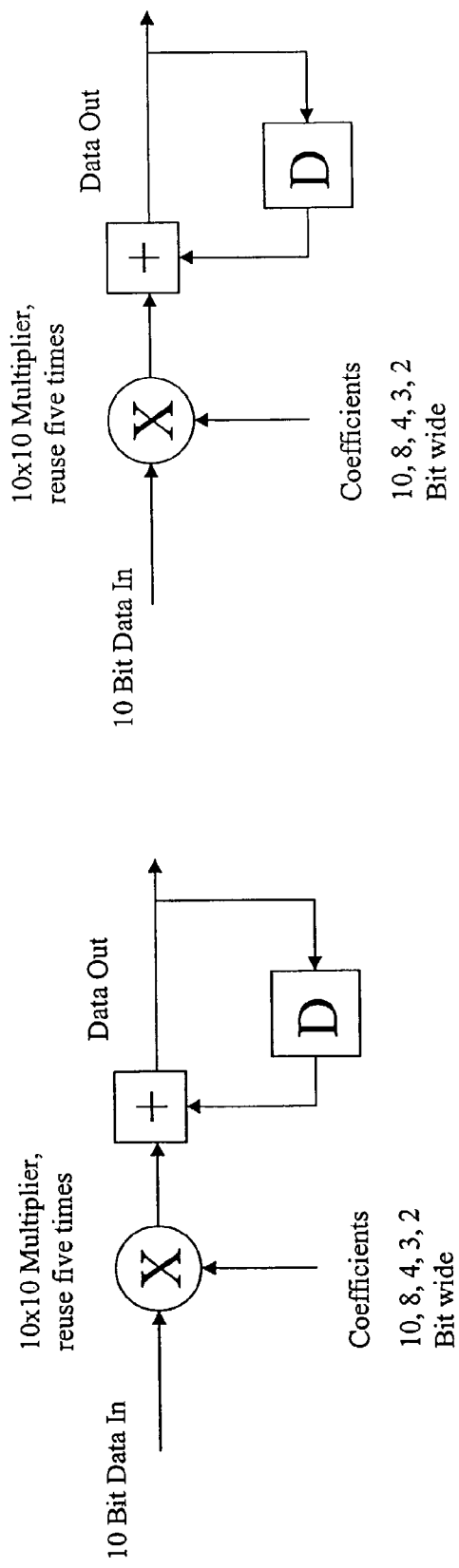
FIG. 2 is a simplified schematic diagram illustrating a typical FIR filter.
Figure 3:
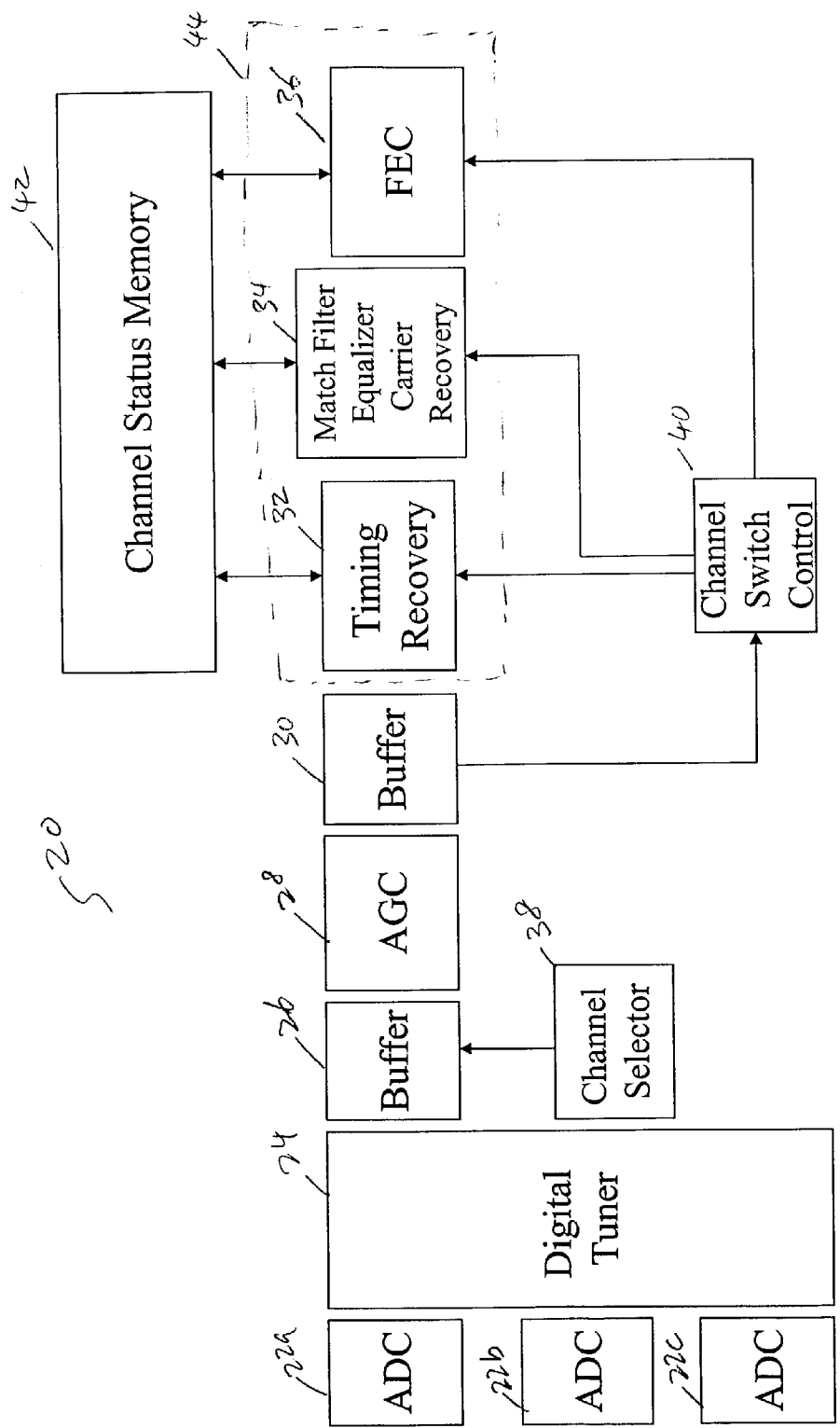
FIG. 3 is a simplified block diagram illustrating one exemplary embodiment of the present invention.

The present invention in the form of one or more exemplary embodiments will now be described. FIG. 3 is a simplified block diagram illustrating one exemplary embodiment of the present invention. In this exemplary embodiment, the system 20 includes a number of analog-digital converters (ADCs) 22, a digital tuner 24, a first data buffer 26, an automatic gain control (AGC) 28, a second data buffer 30, and a demodulation engine 44, all arranged in a sequential manner as shown in FIG. 3. In one exemplary embodiment, the demodulation engine 44 further includes a timing recovery circuit 32, a matched filter, equalizer and carrier recovery circuit 34 and a forward error correction (FEC) circuit 36. As will be further described below, the first data buffer 26 is controlled by a channel selector 38; and the time recovery circuit 32, the matched filter, equalizer and carrier recovery circuit 34 and the FEC circuit 36 interact with both a channel switch control 40 and a channel status memory 42.

The exemplary operations of the system 20 are further described below. Each of the ADCs 22 is a high-speed device that is capable of receiving and processing analog signals from a wideband channel. The wideband channel covers at least one RF channel. The ADCs 22 respectively convert analog signals from various RF channels to corresponding digital signals. Output from the ADCs 22 is then relayed to the digital tuner 24. The digital tuner 24 is utilized to separate the RF channels in the digital domain. The separated signals from the RF channels are then stored in the first data buffer 26 for subsequent processing. The channel selector 38 is used to control how the corresponding data belonging to each RF channel is to be stored in the first data buffer 26.

Data from the first data buffer 26 is then provided to the AGC 28. The AGC 28 is able to process data from multiple RF channels in a concurrent manner. The AGC 28 is utilized to keep the signal strength of each individual channel at a relatively constant level. Keeping the signal strength of the RF channel at a relatively constant level ensures the proper functioning of a timing recovery circuit and an equalizer. It should be understood that a person of ordinary skill in the art should know of various ways and/or methods to implement the functions provided by the AGC 28.

Output from the AGC 28 is then provided to the second data buffer 30 where it is stored for subsequent processing.

As will be further described below, data from the various RF channels are to be processed separately. The channel switch control 40 is used to select the corresponding data belonging to the RF channel that is to be processed from the second data buffer 30.

The data to be processed is then loaded into the demodulation engine 44 for demodulation processing. As noted above, the demodulation engine 44 includes the timing recovery circuit 32, the matched filter, equalizer and carrier recovery circuit 34 and the FEC circuit 36. The timing recovery circuit 32 is used to identify the optimal sampling time and restore signal values at the optimal sampling time. The matched filter, equalizer and carrier recovery circuit 34 is utilized to remove channel echoes, minimize inter-symbol-interference, and compensate residual carrier frequency and phase shift. The FEC circuit 36 is employed to extract coded data bit and correct transmission error. A person of ordinary skill in the art will know of the various ways and/or methods to implement the respective functions of the timing recovery circuit 32, the matched filter, equalizer and carrier recovery circuit 34 and the FEC circuit 36.

In one exemplary embodiment, the system 20 has three operating modes, namely, a channel switching mode, a data processing mode, and a waiting mode.

In the data processing mode, the demodulation engine 44 recovers a predetermined number of symbols from the current channel data corresponding to a particular channel. A person of ordinary skill in the art will appreciate how to derive the predetermined number of symbols. In one exemplary aspect, once the predetermined number of symbols has been processed, the demodulation engine 44 pauses for further processing instructions. Subsequent processing instructions may direct the demodulation engine 44 to engage in any one of the three operating modes. For example, the demodulation engine 44 may be directed to continue the data processing mode; alternatively, the demodulation engine may be switched into the channel switching mode or the waiting mode.

In the channel switching mode, the demodulation engine 44 switches current channel data with selected data from another channel for processing. In other words, data from a new channel is loaded into the demodulation engine 44 for processing. More specifically, status and history information relating to the current channel is stored into the channel status memory 42 and current channel data is stored into the second data buffer 30; and status and history information relating to the next channel to be processed is retrieved from the channel status memory 42 and the corresponding channel data that is to be operated on is extracted from the second data buffer 30 and loaded into the demodulation engine 44 for processing.

Figure 4:
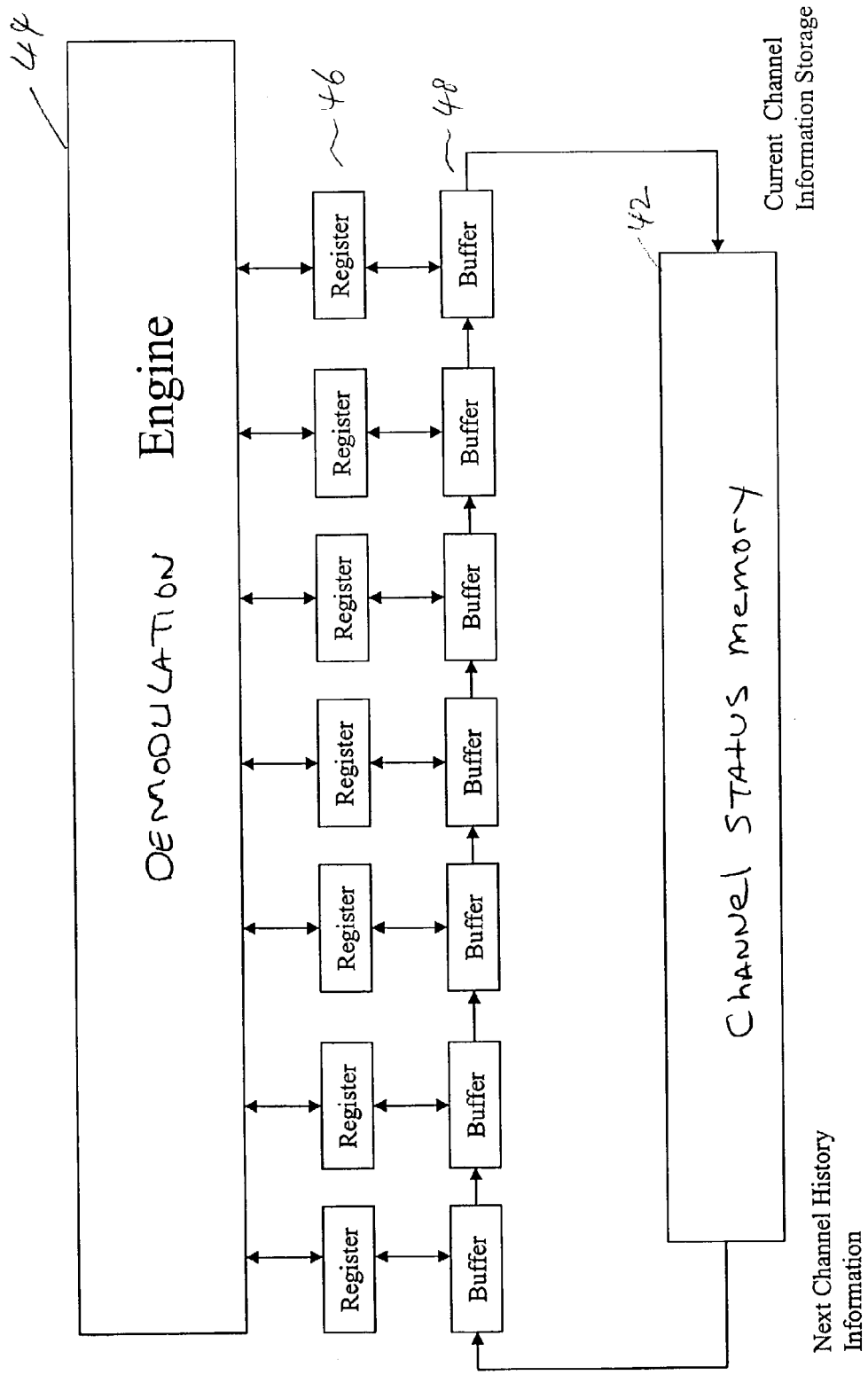
FIG. 4 is a simplified block diagram illustrating optimized channel switching by one exemplary embodiment of the present invention.

The storing and retrieving of channel data and status and history information require a certain amount of processing time. In one exemplary aspect, in order to optimize or reduce the switching time during the channel switching mode, the system 20 preloads the status and, history information relating to the next channel to be processed during the data processing mode. FIG. 4 illustrates one exemplary architecture used to provide optimized channel switching by the system 20. In this exemplary architecture, a number of registers 46 and a number of buffers 48 are positioned between the demodulation engine 44 and the channel status memory 42. The registers 46 are used to hold and supply status and history information relating to the current channel that is being processed by the demodulation engine 44. The buffers 48 are used to hold status and history information relating to the next channel that is to be processed. More specifically, when the current channel is being processed, the status and history information relating to the next channel to be processed is preloaded into the buffers 48 from the channel status memory 42. For example, once a piece of data is processed, the corresponding status and history information is put back into the channel status memory 42 and the status and history information corresponding to a new piece of data belonging to the next channel to be processed is preloaded into a buffer 48 from the channel status memory 42. Once the demodulation engine 44 enters the channel switching mode, information in the preloaded buffers 48 can be quickly transferred to the registers 46 for use when the demodulation engine 44 enters back into the data processing mode. In this manner, since status and history information for the next channel is preloaded during the previous data processing mode, the channel switching mode once initiated can be completed within fewer number of clock cycles. The reduction of channel switching time allows the demodulation engine 44 to operate more efficiently, i.e., it allows the demodulation engine 44 to spend more time in the data processing mode thereby processing more data. As a result, more channels can be processed or higher throughput can be achieved.

In the waiting mode, the demodulation engine 44 remains idle for a certain period of time or number of clock cycles. This period of time or number of clock cycles can be either fixed or variable, depending on the design of a particular application. The demodulation engine 44 may enter into the waiting mode when there is a gap between the data processing mode and the channel switching mode. When in the waiting mode, the demodulation engine 44 is designed to have a power saving feature to reduce consumption of power.

Figure 5:
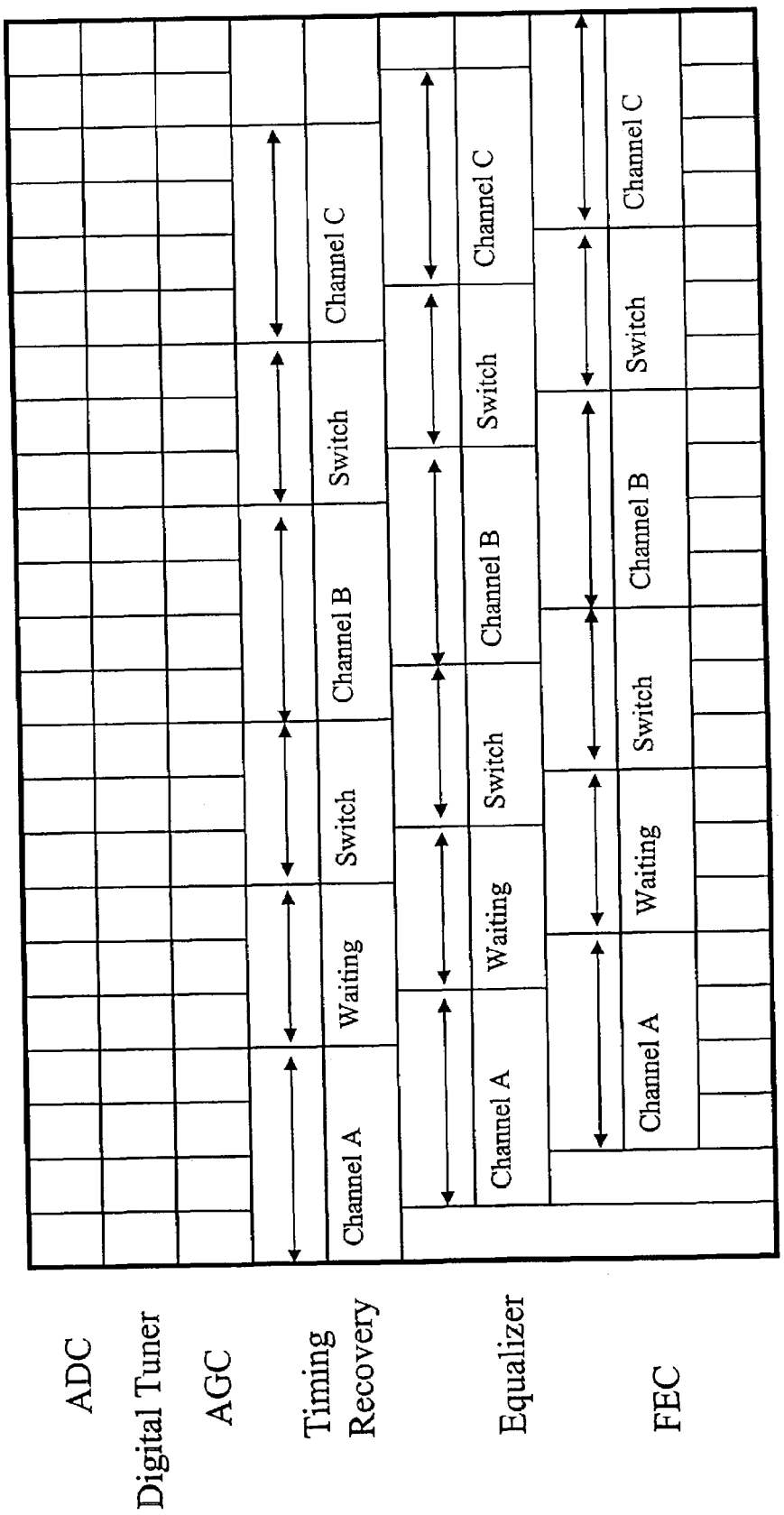
FIG. 5 is a simplified timing diagram illustrating processing and switching of channels by an exemplary embodiment of the present invention.

FIG. 5 is a simplified timing diagram illustrating processing and switching of the channels by the demodulation engine 44. As shown in FIG. 3, there are two data buffers in the data path, namely, the first and second data buffers 26 and 30. The first data buffer 26 is located between the digital tuner 24 and the AGC 28, and the second data buffer 30 is located between the AGC 28 and the timing recovery circuit 32. As described above, it can be seen that the demodulation engine 44 is shared amongst different RF channels. Referring to FIG. 5, respective data from various channels are switched and processed by the system 20. For example, at $t_0$, when the timing recovery circuit 32 is processing data from Channel A, respective channel data belonging to Channel B and Channel C are stored in the second data buffer 30 and corresponding channel status and history information is also stored in the channel status memory 42. At $t_1$, after a certain number of symbols from Channel A has been processed, the demodulation engine 44 pauses for further processing instructions. The next processing instructions indicate that the demodulation engine 44 is to go into the waiting mode. Subsequently, at $t_2$, the demodulation engine 44 is directed to enter the channel switching mode. Under the channel switching mode, the channel switch control 40 sends a command to switch the current channel to Channel B. As a result, channel data from Channel A is stored into the second data buffer 30 and status and history information relating to Channel A is stored into the channel status memory 42. Also, the demodulation engine 44 retrieves the corresponding channel data and status and history information relating to Channel B from the second data buffer 30 and the channel status memory 42 respectively. As noted above, the channel switching time can be optimized or reduced by the system 20, if desired. This is accomplished by preloading status and history information relating to the next channel to be processed which, in this case, is Channel B during the data processing mode when data from Channel A is being processed. This allows the channel switching mode to be completed in fewer number of clock cycles. At $t_3$, once the channel switching mode is complete, the demodulation engine 44 enters into the data processing mode and begins to process the channel data belonging to Channel B. Similarly, at $t_4$, the demodulation engine 44 enters into the channel switching mode again, this time, swapping channel data from Channel B to Channel C. Similarly, the channel switching time can be reduced by preloading status and history information relating to Channel C. At $t_5$, the demodulation engine 44 resumes the data processing mode and begins to process channel data belonging to Channel C.

Figure 6:
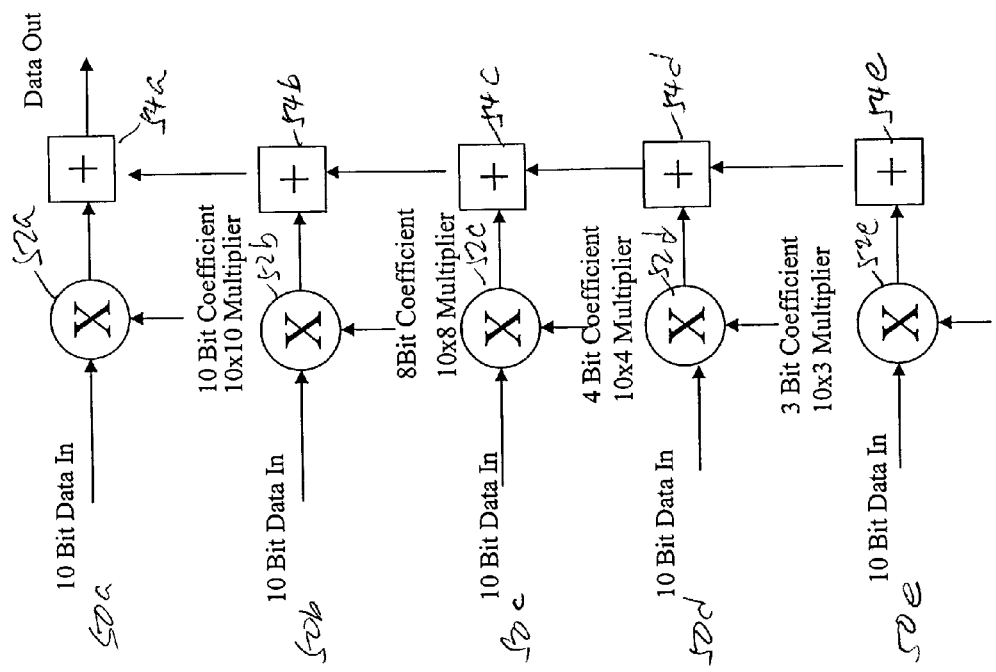
FIG. 6 is a simplified schematic diagram illustrating an exemplary embodiment of the fully parallel low pass FIR filter according to the present invention.

According to another exemplary aspect of the system 20, the system 20 includes a fully parallel low pass FIR filter. A FIR filter is designed to perform the following calculations: Z=sum (Xi*Yi), where Xi is the input data, Yi is the coefficients and Z is the output data. FIG. 6 illustrates an exemplary embodiment of the fully parallel low pass FIR filter according to the present invention. As shown in FIG. 6, this exemplary FIR filter is capable of handling five (5) channels in a concurrent manner with each channel having a 10-bit data stream. The identical data streams 50a-e are generated based on an input data stream from a single channel. Identical data streams 50a-e are provided to a number of multipliers 52a-e in parallel. The size of each multiplier 52a-e varies depending on its corresponding coefficient. For example, the size of multiplier 52a is 10×10 (based on the 10-bit data stream and the 10-bit coefficient) and the size of multiplier 52c is 10×4 (based on the 10-bit data stream and the 4-bit coefficient). The respective results from the multipliers 52a-e are then added together by a number of adders 54a-e to generate the output data. By processing the input data streams in parallel and having multipliers with different sizes based on their corresponding coefficients, a significant saving in silicon resource is achieved thereby allowing the size of an integrated circuit chip to be reduced or increasing the amount of circuitry that can be incorporated in the integrated circuit chip. The fully parallel low pass FIR filter of the present invention can be deployed in various components of the system 20. For example, this filter can be used in the digital tuner 24 and various components of the demodulation engine 44 including the timing recovery circuit 32, the matched filter, equalizer and carrier recovery circuit 34 and the FEC circuit 36. Based on the disclosure and teaching provided herein, a person of ordinary skill in the art will know of other ways and/or methods to deploy the fully parallel low pass FIR filter of the present invention.

The present invention as described herein can be implemented in various ways and/or manner. For example, the system 20 can be implemented using control logic in the form of software or hardware or a combination of both. A person of ordinary skill in the art will know of other ways and/or methods to implement the present invention.

It should be understood that the present invention can be deployed in various applications. For example, the present invention can be incorporated in an integrated circuit chip within a communication system. A person of ordinary skill in the art will know of other ways and/or applications in which to deploy the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An improved multi-channel demodulator comprising:
 a data buffer configured to store digitized channel data corresponding to a plurality of RF channels; and
 a demodulation engine having shared circuitry that is used to demodulate the digitized channel data from the plurality of RF channels, the demodulation engine being configured to provide demodulation processing on data corresponding to a first channel, the demodulation engine further configured to be able to store processed data corresponding to the first channel into the data buffer and load data corresponding to a second channel from the data buffer for subsequent demodulation processing.

2. The demodulator of claim 1 further comprising:
an automatic gain control configured to process the digitized channel data corresponding to the plurality of channels to maintain the channel data at their respective constant levels before the channel data is processed by the demodulation engine.

3. An improved multi-channel demodulator comprising:
a data buffer configured to store channel data corresponding to a plurality of channels; and
a demodulation engine configured to provide demodulation processing on data corresponding to a first channel, the demodulation engine further configured to be able to store the data corresponding to the first channel into the data buffer and load data corresponding to a second channel from the data buffer for demodulation processing, wherein:
the demodulation engine has two operating modes including a channel switching mode and a data processing mode;
in the data processing mode, the demodulation engine provides demodulation processing on data that is currently loaded into the demodulation engine; and
in the channel switching mode, the demodulation engine stores the data that is currently loaded into the demodulation engine into the data buffer and loads data corresponding to another channel from the data buffer for demodulation processing.

4. The demodulator of claim 3 wherein:
the demodulation engine has an additional operating mode including a waiting mode; and
in the waiting mode, the demodulation engine awaits further instructions to determine whether to engage in the data processing mode or the channel switching mode.

5. The demodulator of claim 3 wherein in the channel switching mode, when the data that is currently loaded into the demodulation engine is stored into the data buffer, status and history information relating to the data being stored into the data buffer is stored into a channel status memory, and when the data corresponding to another channel is loaded from the data buffer for demodulation processing, status and history information relating to the data being loaded is retrieved from the channel status memory.

6. The demodulator of claim 3 wherein status and history information relating to another channel is preloaded during the data processing mode.

7. An improved multi-channel demodulator comprising:
a data buffer configured to store channel data corresponding to a plurality of channels; and
a demodulation engine configured to provide demodulation processing on data corresponding to a first channel, the demodulation engine further configured to be able to store the data corresponding to the first channel into the data buffer and load data corresponding to a second channel from the data buffer for demodulation processing, wherein the demodulation engine comprises:
a timing recovery circuit;
a matched filter, equalizer and carrier recovery circuit; and
a forward error correction circuit;
wherein the timing recovery circuit, the matched filter, equalizer and carrier recovery circuit and the forward error correction circuit are arranged in a sequential configuration.

8. An integrated circuit chip incorporating the demodulator as recited in claim 1.

9. An improved multi-channel demodulator comprising:
a data buffer configured to store channel data corresponding to a plurality of channels; and
a demodulation engine configured to provide demodulation processing on data corresponding to a first channel, the demodulation engine further configured to be able to store the data corresponding to the first channel into the data buffer and load data corresponding to a second channel from the data buffer for demodulation processing, wherein one or more components of the demodulation engine has deployed therewithin a parallel FIR filter comprising:
a plurality of multipliers configured to respectively receive corresponding multiple input data streams and coefficients, the multiple input data streams being identical and generated from channel data from a single channel, the size of each multiplier depending on its corresponding input data stream and coefficient, the corresponding coefficients being different from each other; and
a plurality of adders configured to sum up the respective output of the plurality of multipliers to generate an output data stream.

10. A system for providing multi-channel demodulation, comprising:
a demodulation engine having shared circuitry that is configured to provide demodulation processing of digitized channel data corresponding to a plurality of RF channels, the demodulation engine further configured to be able to switch between respective data corresponding to a first channel and a second channel for demodulation processing; and
a channel status memory configured to store respective status and history information relating to the first channel and the second channel.

11. The system of claim 10 further comprising:
an automatic gain control configured to process the respective digitized data corresponding to the first channel and the second channel to maintain the respective data at their constant levels before the respective data is processed by the demodulation engine.

12. A system for providing multi-channel demodulation, comprising:
a demodulation engine configured to provide demodulation processing, the demodulation engine further configured to be able to switch between respective data corresponding to a first channel and a second channel for demodulation processing; and
a channel status memory configured to store respective status and history information relating to the first channel and the second channel, wherein:
the demodulation engine has two operating modes including a channel switching mode and a data processing mode;
in the data processing mode, the demodulation engine provides demodulation processing on the data corresponding to the first channel; and
in the channel switching mode, the demodulation engine directs the data corresponding to the first channel to be stored and loads the data corresponding to the second channel for demodulation processing.

13. The system of claim 12 wherein the demodulation engine has an additional operating mode including a waiting mode; and in the waiting mode, the demodulation engine awaits further instructions to determine whether to engage in the data processing mode or the channel switching mode.

14. The system of claim 12 wherein in the data processing mode, the demodulation engine preloads status and history information relating to the second channel from the channel status memory.

15. The system of claim 12 wherein in the channel switching mode, when the demodulation engine directs the data corresponding to the first channel to be stored, status and history information relating to the first channel is stored into the channel status memory, and when the demodulation engine loads the data corresponding to the second channel, status and history information relating to the second channel is retrieved from the channel status memory.

16. A system for providing multi-channel demodulation, comprising:
a demodulation engine configured to provide demodulation processing, the demodulation engine further configured to be able to switch between respective data corresponding to a first channel and a second channel for demodulation processing; and
a channel status memory configured to store respective status and history information relating to the first channel and the second channel, wherein the demodulation engine comprises:
a timing recovery circuit;
a matched filter, equalizer and carrier recovery circuit; and
a forward error correction circuit;
wherein the timing recovery circuit, the matched filter, equalizer and carrier recovery circuit and the forward error correction circuit are arranged in a sequential configuration.

17. An integrated circuit chip incorporating the system as recited in claim 10.

18. A system for providing multi-channel demodulation, comprising:
a demodulation engine configured to provide demodulation processing, the demodulation engine further configured to be able to switch between respective data corresponding to a first channel and a second channel for demodulation processing, wherein one or more components of the demodulation engine has deployed therewithin a parallel FIR filter comprising:
a plurality of multipliers configured to respectively receive corresponding multiple input data streams and coefficients, the multiple input data streams being identical and generated from the data corresponding to the first channel, the size of each multiplier depending on its corresponding input data stream and coefficient, the corresponding coefficients being different from each other; and
a plurality of adders configured to sum up the respective output of the plurality of multipliers to generate an output data stream; and
a channel status memory configured to store respective status and history information relating to the first channel and the second channel.

19. An improved multi-channel demodulator comprising:
an automatic gain control configured to process digitized channel data corresponding to a plurality of RF channels to maintain the channel data at their respective constant levels;
a data buffer configured to store the processed channel data output by the automatic gain control;
a demodulation engine having shared circuitry that is configured to provide demodulation processing, the demodulation engine further configured to be able to switch between respective processed channel data corresponding to a first channel and a second channel for demodulation processing; and
a channel status memory configured to store respective status and history information relating to the first channel and the second channel.

20. The demodulator of claim 19 wherein:
the demodulation engine has two operating modes including a channel switching mode and a data processing mode;
in the data processing mode, the demodulation engine provides demodulation processing on the processed channel data corresponding to the first channel; and
in the channel switching mode, the demodulation engine switches between respective processed channel data corresponding to the first channel and the second channel for demodulation processing.

21. The demodulator of claim 20 wherein:
the demodulation engine has an additional operating mode including a waiting mode; and
in the waiting mode, the demodulation engine awaits further instructions to determine whether to engage in the data processing mode or the channel switching mode.

22. The demodulator of claim 20 wherein in the data processing mode, the demodulation engine preloads status and history information relating to the second channel from the channel status memory.

23. The demodulator of claim 20 wherein in the channel switching mode, when the demodulation engine switches between respective processed channel data corresponding to the first channel and the second channel for demodulation processing, status and history information relating to the first channel and the second channel is respectively stored into and retrieved from the channel status memory.

24. The demodulator of claim 19 wherein the demodulation engine further comprises:
a timing recovery circuit;
a matched filter, equalizer and carrier recovery circuit; and
a forward error correction circuit;
wherein the timing recovery circuit, the matched filter, equalizer and carrier recovery circuit and the forward error correction circuit are arranged in a sequential configuration.

25. An integrated circuit chip incorporating the demodulator as recited in claim 19.

26. The demodulator of claim 19 further comprising:
a parallel FIR filter comprising:
a plurality of multipliers configured to respectively receive corresponding multiple input data streams and coefficients, the multiple input data streams being identical and generated from the processed channel data corresponding to the first channel, the size of each multiplier depending on its corresponding input data stream and coefficient, the corresponding coefficients being different from each other; and
a plurality of adders configured to sum up the respective output of the plurality of multipliers to generate an output data stream;
wherein the parallel FIR filter is deployed within one or more components of the demodulation engine.

27. A method for providing multi-channel demodulation, comprising:
   storing digitized channel data corresponding to a plurality of RF channels in a data buffer;
   loading channel data corresponding to a first channel from the data buffer into a demodulation engine having shared circuitry;
   directing the demodulation engine to demodulate the channel data corresponding to the first channel using the shared circuitry;
   storing the demodulated channel data corresponding to the first channel in the data buffer;
   loading channel data corresponding to a second channel from the data buffer into the demodulation engine; and
   directing the demodulation engine to demodulate the channel data corresponding to the second channel using the shared circuitry.

28. The method of claim 27 further comprising:
   processing the digitized channel data corresponding to the first channel using an automatic gain control before loading the channel data corresponding the first channel into the demodulation engine.

29. The method of claim 27 further comprising:
   in connection with the storing of the demodulated channel data corresponding to the first channel in the data buffer, storing status and history information relating to the first channel into a channel status memory.

30. The method of claim 27 further comprising:
   while directing the demodulation engine to demodulate the channel data corresponding to the first channel, preloading status and history information relating to the second channel from a channel status memory.

31. The method of claim 27 further comprising:
   in connection with the loading of the channel data corresponding to the second channel from the data buffer into the demodulation engine, retrieving status and history information relating to the second channel from a channel status memory.

32. An integrated circuit chip incorporating the method as recited in claim 27.

33. A method for providing multi-channel demodulation, comprising:
   storing channel data corresponding to a plurality of channels in a data buffer;
   loading channel data corresponding to a first channel from the data buffer into a demodulation engine;
   upon receiving indication to engage in a data processing mode, directing the demodulation engine to demodulate the channel data corresponding to the first channel;
   upon receiving indication to engage in a channel switching mode, storing the demodulated channel data corresponding to the first channel in the data buffer and loading channel data corresponding to a second channel from the data buffer into the demodulation engine; and
   upon receiving indication to engage in the data processing mode, directing the demodulation engine to demodulate the channel data corresponding to the second channel.

34. The method of claim 33 further comprising:
   processing the channel data corresponding to the first channel using an automatic gain control before loading the channel data corresponding the first channel into the demodulation engine.

35. The method of claim 33 further comprising:
   in connection with the storing of the demodulated channel data corresponding to the first channel in the data buffer, storing status and history information relating to the first channel into a channel status memory.

36. The method of claim 33 further comprising:
   while directing the demodulation engine to demodulate the channel data corresponding to the first channel in the data processing mode, preloading status and history information relating to the second channel from a channel status memory.

37. The method of claim 33 further comprising:
   in connection with the loading of the channel data corresponding to the second channel from the data buffer into the demodulation engine, retrieving status and history information relating to the second channel from a channel status memory.

38. An integrated circuit chip incorporating the method as recited in claim 33.

39. An improved multi-channel demodulator comprising:
   a data buffer configured to store digitized channel data corresponding to a plurality of RF channels; and
   a demodulation engine having shared circuitry that is used to demodulate the digitized channel data from the plurality of RF channels, the demodulation engine being configured to provide demodulation processing on data corresponding to a first channel, the demodulation engine further configured to be able to store the data corresponding to the first channel into the data buffer and load data corresponding to a second channel from the data buffer for demodulation processing.

* * * * *